Oct. 21, 1952 M. BONOTTO 2,614,911
COUNTERCURRENT EXTRACTION PROCESS AND APPARATUS
Filed May 7, 1947 2 SHEETS—SHEET 1
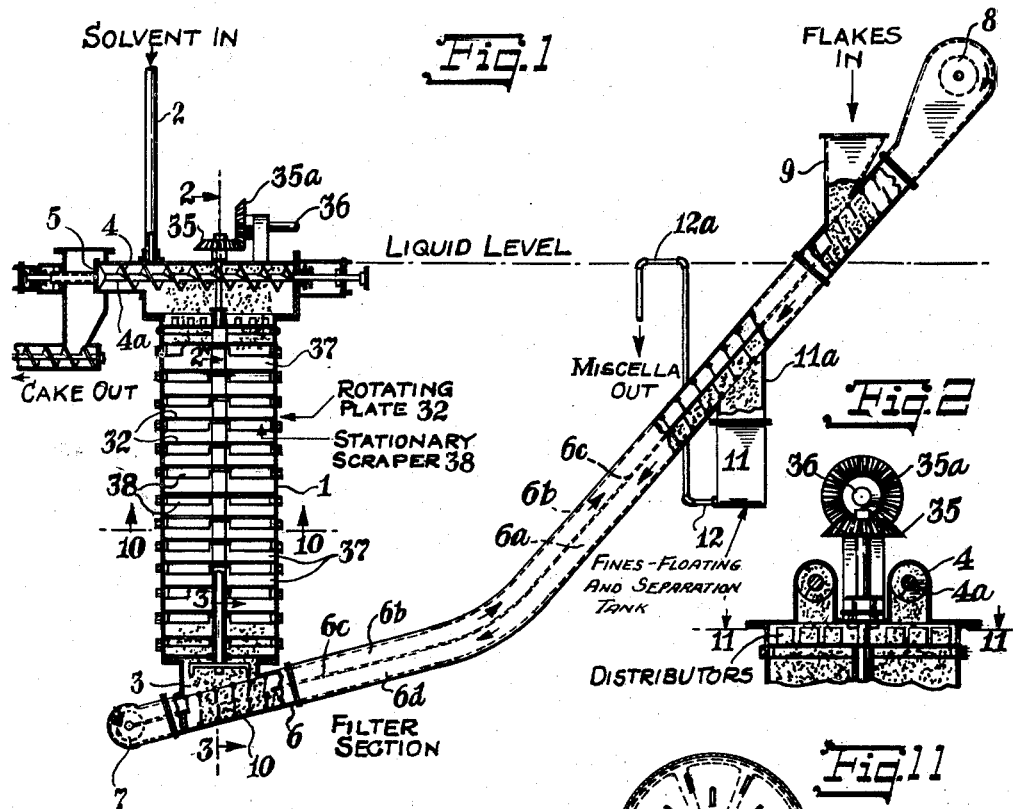
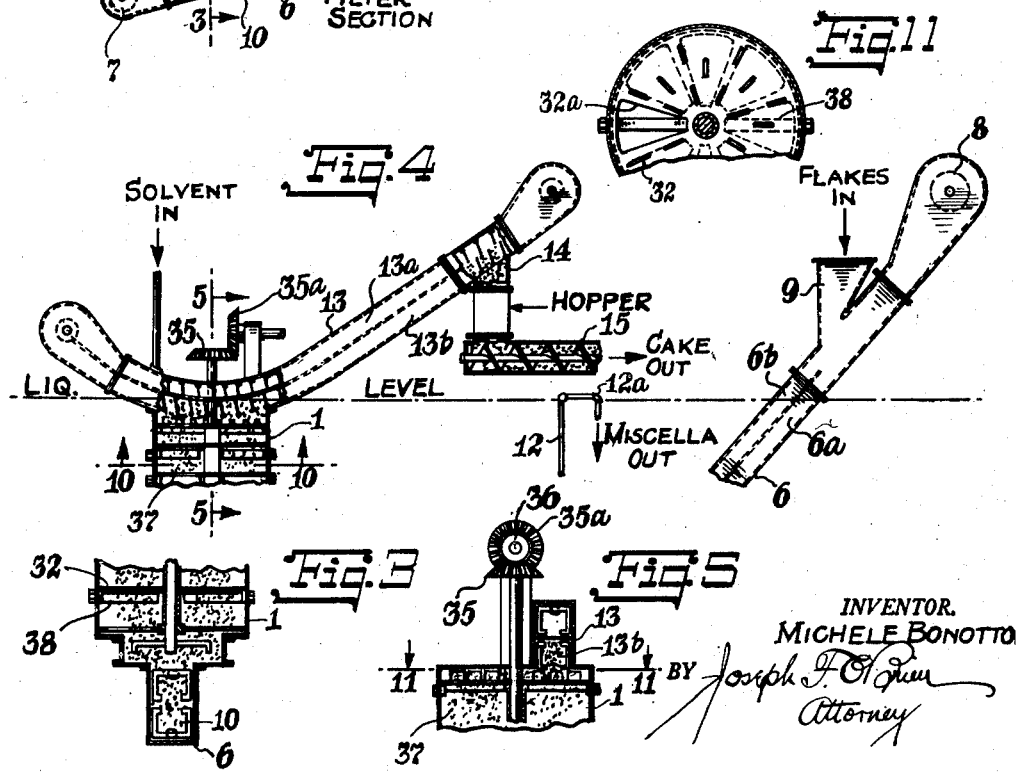
INVENTOR.
MICHELE BONOTTO
BY Joseph F. O'Brien
Attorney

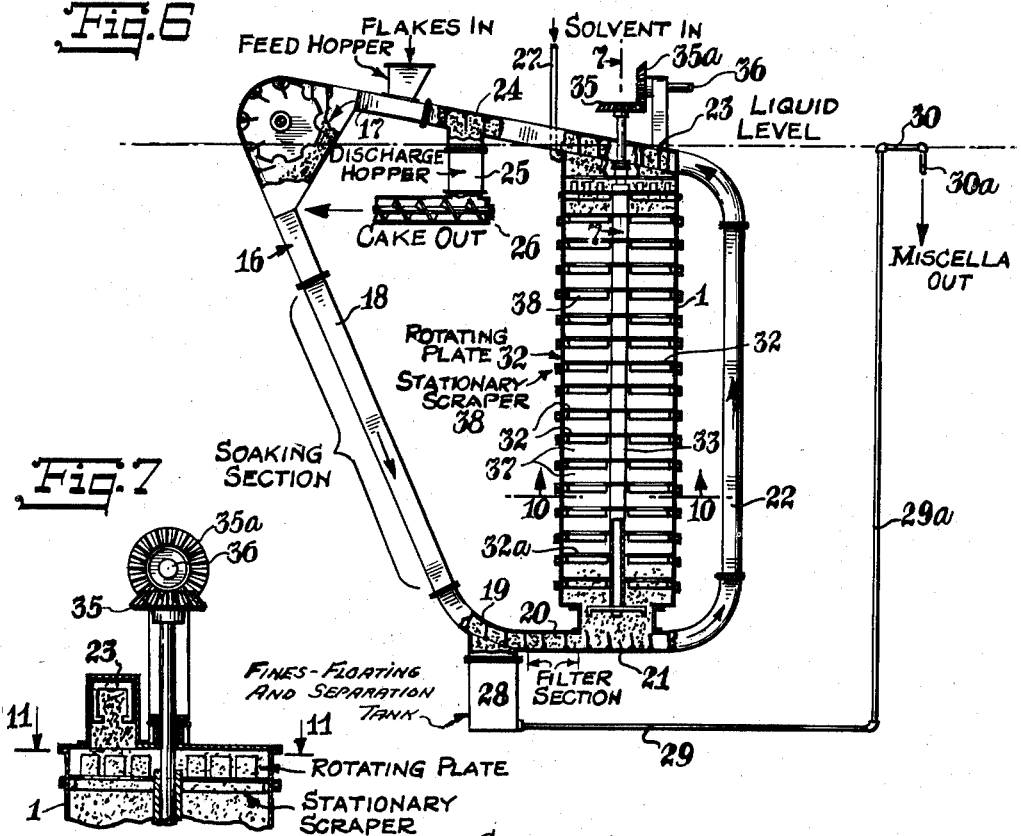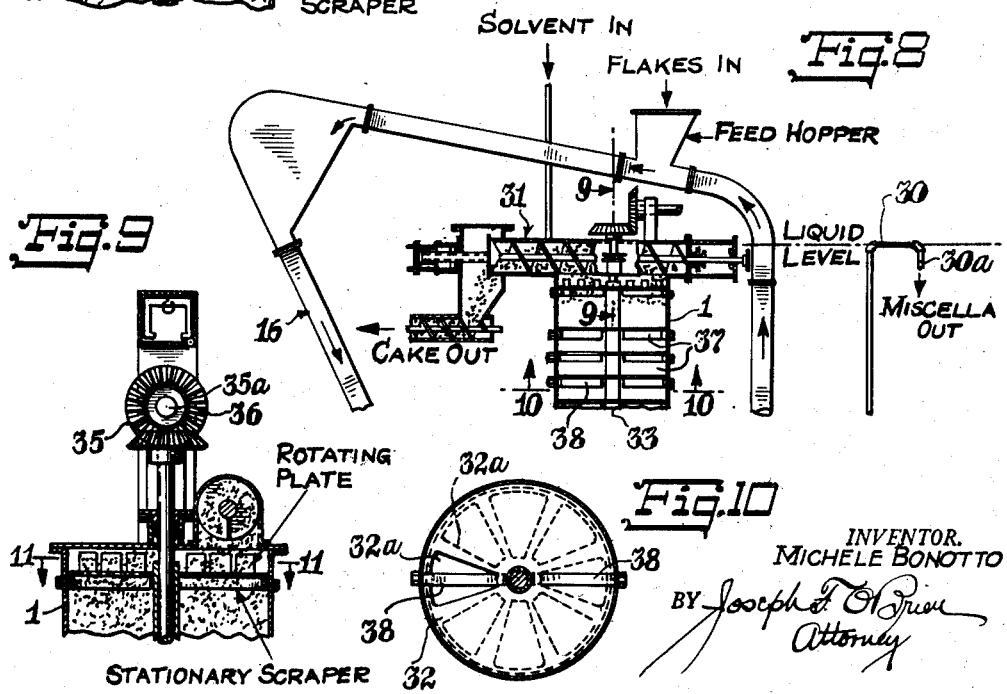

Patented Oct. 21, 1952

2,614,911

UNITED STATES PATENT OFFICE 2,614,911

COUNTERCURRENT EXTRACTION PROCESS AND APPARATUS

Michele Bonotto, Princeton, N. J.

Application May 7, 1947, Serial No. 746,526

4 Claims. (Cl. 23—310)

This invention relates to improvements in process and apparatus for the continuous counter-current extraction of buoyant materials and for the continuous filtering and settling of miscella embodying buoyant fines.

In earlier patents, I have shown and described process and apparatus for the counter-current extraction of oil from oil-bearing process materials having greater weight per volume than the solvent employed so as to sink therein; also in my Patent #2,273,557, dated February 17, 1942 I have disclosed a continuous counter-current extraction apparatus adapted to extract oil from similar sinking material fed thereto in flaked condition, and I have passed such flaked process material through an elongated material-feeding conveyor-conduit into which miscella from the extractor is fed so that the said conveyor-conduit embodies a filter section and the flaked material being conveyed through said conduit is utilized as a filtering medium for the miscella. The process material being conveyed is thus loaded and has its interstices filled with fines of the same material, and is thereafter fed into and passed through the extraction apparatus in a conventional manner.

In the apparatus and process of said Patent No. 2,273,557, the filter section is provided with perforations or screens in the walls of the conduits through which the filtered miscella or filtrate passes to a discharge outlet. With certain types of material, the screens of my said patent at times become clogged and in a pending patent application Serial No. 689,538, filed August 9, 1946, now Patent No. 2,582,675, I have disclosed a process and apparatus in which the cloggible screens are eliminated and the feed-conveyor conduit has a connection intermediate its inlet and outlet ends with the settling end of a settling tank through which liquid miscella from the extractor column is passed and discharged in counter-current with the conveying movement of the process material in said conduit, fines in said miscella being thus settled in said tank and added through said connection with the feed-conveyor conduit to the flaked process material being conveyed to the extractor. The feed-conveyor conduit with its extractor-feeding load of flaked material is thus utilized as a filter, the miscella from the extractor is subjected to a fines-settling action, the fines so settled are added to the process material being fed to the extractor, and the process material enriched with such loaded fines is then fed to the extractor.

One of the objects of my present invention is to provide process and apparatus in which process materials that in either solid, flaked or granulated condition are of lower specific gravity than the solvent utilized; and float therein may be subjected to continuous counter-current extraction preferably in an extraction column having efficiency characteristics similar to those of my said earlier patents; to utilize a feed-conveyor conduit with a feeding-load therein as a filter for miscella from the extractor; to cause buoyant fines in miscella of such a relatively heavy liquid solvent to be subjected to a fines floating and separating action, and during the conveyance of the process material to the extractor; to cause such fines to be loaded on and carried with said process material into the extractor, whereby the process material will be enriched with such floated buoyant fines from miscella produced in the extractor.

Another object of my invention is to improve and adapt the extraction column more particularly shown and described in my earlier Patent No. 2,156,236 for the extraction of solvent-buoyant materials, and to this end I utilize a column having a feed conduit connected at one end to the bottom thereof, having its body portion extending upwardly through and above the liquid level and provided with an inlet above said level, thus enabling the feeding of a solvent-buoyant process material into said extraction column through the bottom thereof, and to cause in said column a normal upward floating of buoyant movement thereof through a heavier solvent fed into the upper portion of said extraction column above or at said liquid level and having a normal downward flow of movement through and in counter-current with said buoyant process material.

Another object of my invention is to provide in an extraction column for use with solvent-buoyant materials of the character specified means for subdividing the extraction column into a series of sections by pressure-equalizing partitions having openings, preferably disposed radially of the axis of the column and located out of registration with each other, also providing means for rotating said partitions to permit an upward floating movement through such revolving openings of material and the counter-current movement of the heavier solvent through the various sections of said extraction column so as to produce greatly increased distribution of the solvent and efficient extraction of the oil from such material.

Another object of my invention is to support in the upper portion of each of such sections below the rotating pressure-equalizing partitions, one or more stationary radially-extending scraper arms which provide positive stops against revolving movement of the process material with the partitions.

Another object of my invention is to provide at the upper end of an extraction column mechanism for compressing and discharging extracted material or cake, in combination with conduit means connected with the bottom of the extractor and extending above the liquid level for discharging miscella from said bottom of said column.

Another object of my invention is to connect with the bottom portion of a feed conduit of the type hereinabove specified, the top settling portion of a buoyancy settling tank, to pass and discharge the miscella product of said extraction column through said settling tank and to load settled buoyant fines from the miscella into the process material being fed to the extraction column, thus enriching such material during its conveying movement to the extraction column.

Another object of my invention is to provide a construction of the type specified in which a single, continuous conveyor conduit may be utilized as a feed conveyor, a soaking section, a filter and feed section for the extraction column and also a discharge section therefor.

Still another object of my invention is to enable the efficient extraction of process materials that become buoyant when thinly or finely comminuted, flaked or granulated and also to enable the use of solvents of relatively greater weight per given volume than the flaked comminuted or granulated process material.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is an illustrative view, partly in section and partly in side elevation, of an apparatus embodying my extraction column combined with feed and discharge mechanism for process material and solvent;

Fig. 2 is a section on the line 2—2 of Fig. 1 looking in the direction of the arrows;

Fig. 3 is a section on the line 3—3 of Fig. 1 looking in the direction of the arrows;

Fig. 4 is a fragmentary illustrative view similar to Fig. 1 of a modified form of my invention in which a drag-chain conveyor is utilized as the material-discharge mechanism;

Fig. 5 is a section on the line 5—5 of Fig. 4 looking in the direction of the arrows;

Fig. 6 is an illustrative view, partly in section and partly in side elevation, of a modified form of apparatus in which a single-drag-chain conveyor is utilized both as a feed mechanism, soaking section, filtering section and discharge mechanism;

Fig. 7 is a section on the line 7—7 of Fig. 6 looking in the direction of the arrows;

Fig. 8 is a fragmentary view showing a form of apparatus modified in relation to Fig. 6 to omit the drag-chain conveyor as the material-discharge mechanism and to substitute therefor a screw-conveyor discharge;

Fig. 9 is a section on the line 9—9 of Fig. 8 looking in the direction of the arrows;

Fig. 10 is a section on the lines 10—10 of Figs. 1, 4, 6 and 8 looking in the direction of the arrows; and Fig. 11 is a section on lines 11—11 of Figs. 2, 5, 7 and 9 looking in the direction of the arrows.

In general terms, my present invention comprises the improvement and addition of processes and mechanisms for adapting the processes and apparatus of my earlier patents and application for the extraction of materials having a lower specific gravity than the solvent utilized and consists in feeding by the use of a feed-conduit buoyant process material and then treating the same with relatively heavy solvent fed into said column at the top portion thereof and thoroughly distributed therethrough by subdividing the column into pressure-equalizing sections separated by rotating partitions having radially-extending openings, and preferably providing beneath such rotating partitions stationary or fixed scraper arms adapted to prevent rotation of the material with said rotating partitions, and thus to provide for a highly efficient extraction of such solvent-buoyant material.

In the preferred embodiment of my invention I further improve the process of counter-current oil extraction of such buoyant or floating materials by providing for a clarification of miscella from an extraction column for such buoyant material in a continuous operation by first percolating and filtering said miscella in counter-current through and with a conveyed or moving column of flaked process material in said feed conduit to remove part of the fines therefrom; secondarily, to subject such miscella to a floating separation of the fines therefrom by passing and discharging or decanting such filtered miscella through a settling tank connected to the bottom portion of said feed-conduit to remove floating fines therefrom, and in the same operation to automatically introduce into the process material during conveying movement thereof the floating fines separated out in the floating separation operation; thus loading said buoyant process material with fines, first, in the percolating and filtering operation and then in the addition thereto of settled fines, and, lastly, feeding said fines-enriched process material of said buoyant type to an oil extraction operation in an extractor especially adapted for such buoyant material. I preferably accomplish these results by a counter-current percolating and filtering movement of the miscella product resulting from an extraction operation in the extractor through solid process material during a conveying and feeding movement thereof by a feed-conveyor conduit to the extractor, passing the filtered miscella through a fines-floating and separation tank connected with the bottom of said feed conveyor conduit and discharging or decanting the said filtered miscella through said tank.

I also preferably provide in my feed-conveyor conduit for an initial soaking of the process material in the miscella product of the extractor.

Referring now to these drawings, which illustrate a preferred embodiment of mechanical apparatus for carrying out my invention, 1 indicates a vertically disposed extraction column having at its upper end a solvent inlet conduit 2 and provided at its lower end with an inlet 3 for process material and also having mounted at its upper end in communication with the extractor a discharge-screw conveyor-conduit 4 having at its discharge end a screw-free section 4ª closed by a spring-pressed valve 5 and adapted to provide in said screw-free section a compressed plug of the process material, so as to cause the conduit 4 and the extraction column to be liquid and vapor tight.

The bottom inlet end 3 of the column 1 has connected thereto an endless drag-chain conveyor 6 having an outlet portion extending diametrically across the bottom of the extraction column 1, as more particularly shown in Fig. 3, a body portion extending upwardly a suitable distance above the liquid level in the extractor and is provided at its upper end with an inlet section to which, as shown, is connected a feed-hopper 9. Said drag-chain conveyor comprises legs 6ª—6ᵇ separated by a partition 6ᶜ and the continuous chain therein turns at the lower end of the conveyor-conduit about a suitable pulley 7 and extends upwardly, as aforesaid, a suitable distance above the liquid level where said chain again turns about a suitable pulley 8. The inlet hopper 9 for the feeding of flaked process material is preferably connected to the leg 6ᵇ, the partition being interrupted at the inlet portion, so that the flakes move downwardly in the leg 6ª to the communicating inlet opening 10 between said conduit 6 and the extraction column 1. The connection with the column also preferably extends across the leg 6ᵇ, the partition 6ᶜ which separates these legs for the greater part of their distance being also interrupted at this place. While the flakes from the inlet hopper 9 preferably pass through the opening in the partition 6ᶜ and enter the downwardly moving leg 6ª, any flakes which may be engaged and carried by the upwardly-moving portion of the drag chain conveyor will finally reach the downwardly moving portion or leg and in operation, the leg or conduit 6ª will be continuously full of process material.

Intermediate the conduit inlet 9 for process material and the column inlet 10, the full leg 6 is connected to the upper end 11ª of a buoyancy settling tank 11 and the extraction liquid miscella with its load of oil will, after its travel through the extractor, pass into and through a filter section 6ᵈ between the miscella outlet of the column and the fines-floating and separation tank 11 and will then pass through the decanting or discharge pipe or conduit 12 to a position 12ª extending above the liquid level to permit a suitable discharge or decanting thereof.

In Figs. 4 and 5 I have shown a modified form of apparatus of the general type illustrated in Figs. 1 to 3. In this construction the extraction tank, inlet hopper for flaked process material, buoyancy settling tank are in all respects similar to that shown in Fig. 1 but instead of the discharge-screw conduit 4 shown in Fig. 1, I provide a discharge mechanism comprising a double-legged drag-chain conveyor 13 having legs 13ª—13ᵇ connected, as more particularly shown in Fig. 5, with the top of the extraction tank 1 and extending below the liquid-level in the column so that the floating process material rising in the liquid will pass upwardly into the leg 13ᵇ. Movement of the drag-chain will then carry the process material from the extractor upwardly out of and above the liquid and the conduit may have sufficient length to permit a draining for a suitable distance prior to connection with a discharge hopper 14 through which the process material is fed to a discharge-screw-conveyor 15, which is preferably provided with a compressing or squeezing section similar to 4ª and a valve 5 so that such material will be discharged as extracted material in cake form. In all other respects the embodiment shown in Figs. 4 and 5 is similar to that hereinabove described in relation to Figs. 1 to 3.

In Fig. 6 I have illustrated an embodiment of my invention in which a single continuous drag-chain conveyor 16 is utilized to feed and discharge process material. Said continuous drag-chain conveyor preferably comprises in one single conduit a feed section 17, a soaking section 18, a fines-adding section 19, a filter section 20, a material-and-miscella receiving section 21, a liquid-filled but material empty leg 22, and a process-material discharge-section 23 extending, as shown, secantially through the upper portion of the extraction tank 1 to receive buoyant process material and to convey the same to a discharge section 24 which is connected with a discharge hopper 25 which in turn is connected with a screw-conveyor conduit 26 similar to the discharge conduits hereinabove specified which discharge the process material in cake form. As shown, a solvent inlet conduit 27 is connected at the upper end of the column 1 and the solvent is led and distributed through the column filled with process material as hereinabove specified. This liquid with its load of oil and fines, then called miscella, passes into and through a fines-floating and separation tank 28 which is connected to the bottom portion of the conduit 16 at the fines-adding section 19, so that the buoyant fines in the miscella from the extractor 1 will be subjected to a settling action in the settling tank 28 and will be added to the process material being fed to the extractor, and the miscella thus clarified will be conducted by conduit 29—29ª to a position 30 above the liquid level and connected to a suitable miscella outlet 30ª.

In Fig. 8 I have shown another modified form of my invention in which a lower portion of the conduit 16, extraction column 1, buoyancy-settling tank 28 and all other lower parts of the device are in all respects similar to that shown in Fig. 6 but the conduit 16 is at its upper end entirely unconnected from the extraction column and instead of the receiving and discharge sections 23 and 24 I have provided an independent screw conveyor mechanism 31 which is in all respects similar to the screw conveyor mechanism 4 hereinabove described in relation to Fig. 1.

In each of the several embodiments of my invention shown, the extractor is provided with a series of rotatably-mounted pressure-equalizing partitions 32 which, as shown, are mounted on and rotated by an axial shaft 33 suitably supported in the column and rotated through bevel gear 35 connected with bevel gear 35ª fixed on and driven by a shaft 36 from any suitable source of power not shown. The equalizing partitions 32 are each provided with a radially-extending aperture 32ª and the openings or apertures 32ª in these partitions are arranged in positions out of alignment with each other (see Fig. 10) so that solvent passing therethrough will be distributed into process material contained within and filling the various sections 37 between the partitions or plates 32. It is desirable to prevent the process material from turning with the rotating partitions or plates 32 and to prevent this rotation I mount in the upper part of each section 37 a pair of diametrically arranged scraper blades 38, which, in the embodiment shown, has a scraping action with the bottom surface of the rotating partitions or plates 32.

Having described my invention, I claim:

1. A process for the extraction of buoyant solid material in which a solid process material having a lower specific gravity than the solvent utilized is continuously passed through an extraction unit, a solvent having a higher specific gravity than the process material is fed and continuously passed in counter-current, to the movement of said solid material, and liquid miscella is produced, which consists in conducting said miscella to move continuously in counter-current with the movement of said buoyant solid material toward and to the miscella outlet, forming during such conduction a pool of said liquid miscella, discharging said miscella through said pool, conveying the solid material across said pool of said miscella to cause a floating out of fines from said miscella and then conveying said solid material loaded with fines from the miscella to said extraction unit.

2. A process for the extraction of buoyant solid material in which a solid process material having a lower specific gravity than the solvent utilized is continuously passed through an extraction unit, a solvent having a higher specific gravity than the process material is fed and continuously passed in counter-current to the movement of said solid material, and liquid miscella is produced, which consists in conducting said miscella continuously in counter-current with the movement of said buoyant solid material toward and to the miscella outlet, forming from said continuously moving and conducted liquid miscella a pool, discharging said miscella through said pool, conveying said solid material in a path through said moving and conducted miscella to percolate the said miscella through said solid material and to add fines from said miscella thereto, and also moving said solid process material across said pool of said miscella to cause the floating out of fines from said miscella and the adding of such fines to said solid process material and thereafter conveying said solid material so loaded with fines from the miscella to said extraction unit.

3. Apparatus for the extraction of buoyant materials comprising an extraction unit provided at its lower end with a feeding inlet for process material having a lower specific gravity than the solvent utilized and at its upper end having means for discharging said material, an inlet conduit for liquid solvent of higher specific gravity than said process material having a connection with said unit at the upper end thereof, a process material-feeding and miscella-discharge conduit having at its lower end a connection to the lower end of said extraction unit, said conduit being provided with a body portion extending outside said unit in an upwardly direction relatively thereto and having its opposite end projecting above the top of the extraction unit, a feed hopper connected with said upwardly-extending material-feeding and miscella-discharge conduit at a position adjacent to the upper end and above the top of said extraction unit, and conveyor means in said upwardly-extending material-feeding and miscella-discharge conduit which extends and has an upper terminal above said feed hopper and a lower terminal extending below the connection of said upwardly-extending material-feeding and miscella-discharge conduit with said extraction unit.

4. Apparatus for the extraction of buoyant materials as claimed in claim 3 in which a buoyancy fines-separating tank has its upper end open and connected with the lower side of said material-feeding and miscella-discharge conduit at a position intermediate the feed hopper and the bottom of the extraction unit, and conducting means connected with the bottom of said settling tank for discharging miscella therefrom.

MICHELE BONOTTO.

REFERENCES CITED

The following references are of record in the file of this patent:

UNITED STATES PATENTS

| Number | Name | Date |
|---|---|---|
| 2,158,782 | Bonotto | May 16, 1939 |
| 2,183,837 | Hamilton | Dec. 19, 1939 |
| 2,184,248 | Bonotto | Dec. 19, 1939 |